United States Patent
Hamabe (10) Patent No.: US 6,950,671 B2
(45) Date of Patent: Sep. 27, 2005

(54) CELLULAR SYSTEM, BASE STATION, MOBILE STATION AND COMMUNICATION CONTROL METHOD THEREFOR

(75) Inventor: Kojiro Hamabe, Tokyo (JP)

(73) Assignee: NEC Corporation, Tokyo (JP)

(*) Notice: Subject to any disclaimer, the term of this patent is extended or adjusted under 35 U.S.C. 154(b) by 612 days.

(21) Appl. No.: 10/073,212

(22) Filed: Feb. 13, 2002

(65) Prior Publication Data

US 2002/0115467 A1 Aug. 22, 2002

(30) Foreign Application Priority Data

Feb. 21, 2001 (JP) ........................................ 2001-044659
Nov. 7, 2001 (JP) ........................................ 2001-341332

(51) Int. Cl.[7] ................................................ H04Q 7/30
(52) U.S. Cl. .................... 455/522; 455/69; 455/450; 455/452.2; 455/561; 370/335; 370/342
(58) Field of Search .............................. 455/522, 452.2, 455/450, 69, 561; 370/335, 252, 342

(56) References Cited

U.S. PATENT DOCUMENTS 6,693,952 B1 * 2/2004 Chuah et al. ............... 375/140

FOREIGN PATENT DOCUMENTS

| EP | 1113593 A1 * | 1/2001 | ............ H04B/7/26 |
|----|--------------|--------|-----------------------|
| EP | 1 113 593 A1 | 7/2001 | |
| JP | 2991185 | 10/1999 | |
| JP | 3047393 | 3/2000 | |
| JP | 2000-307513 A | 11/2000 | |
| JP | 2002-290327 A | 10/2002 | |
| WO | WO 97/41704 A1 | 11/1997 | |
| WO | WO 98/48575 A2 | 10/1998 | |
| WO | WO 00/62456 A1 | 10/2000 | |
| WO | WO 01/05066 A1 | 1/2001 | |

OTHER PUBLICATIONS

T. Ohgane et al., Adaptive Array and Mobile Communication (II), The Institute of Electronics, Information and Communication Engineers Journal, vol. 82, No. 1, Jan. 1999, pp. 55–61.

T. Ohgane et al., Adaptive Array and Mobile Communication (IV), The Institute of Electronics, Information and Communication Engineers Journal, vol. 82, No. 3, Mar. 1999, pp. 264–271.

* cited by examiner

Primary Examiner—Nick Corsaro
Assistant Examiner—Alan T. Gantt
(74) Attorney, Agent, or Firm—Sughrue Mion, PLLC

(57) ABSTRACT

Growth of interference wave power resulting from the growth of transmission power of the DPCH is prevented to increase line capacity while increasing reliability of control information.

When a base station compares the reception SIR of the DPCH 1 from a mobile station with the desired SIR of the base station, and the reception SIR is smaller than the desired SIR as a result of the comparison, the base station instructs the mobile station to increase transmission power when the DPCH 1 is sent from the base station to the mobile station, but the base station increments the desired SIR by a predetermined offset value (Δ) when the HS-PDSCH is sent from the base station to the mobile station. Consequently, the mobile station increases transmission power compared to the case where only the DPCH 1 is received. Also, the HS-PDSCH is sent to each mobile station in different timing, and therefore only the mobile station increases transmission power.

35 Claims, 5 Drawing Sheets

FIG. 2

UPLINK DPCH

FIG. 3

DOWNLINK DPCH

FIG. 4

SENDING OF HS-PDSCH

| DATA SENT FROM BS | NOTIFICATION OF Primary BY MS | SENDING OF DPCH BY BS | RECEPTION BY MS | REMARKS |
|---|---|---|---|---|
| ONLY (UPLINK/DOWNLINK) DPCH | NOTIFIED | DEPENDING ON CW | RECEIVE ONLY SIGNAL FROM Primary BS | USE OF SSDT |
| (UPLINK/DOWNLINK) DPCH + HS-PDSCH | NOTIFIED | SENDING REGULARLY | SYNTHESIZE SIGNALS FROM Primary AND NON Primary AND RECEIVE THEM | NONUSE OF SSDT |

CELLULAR SYSTEM, BASE STATION, MOBILE STATION AND COMMUNICATION CONTROL METHOD THEREFOR

BACKGROUND OF THE INVENTION

1. Field of the Invention

The present invention relates to a cellular system, a base station, a mobile station and a communication control method therefor, and particularly to a cellular system, a base station, a mobile station and a communication control method therefor that can increase reliability of transmission of control information in High-Speed Downlink Packet Access (HSDPA).

2. Description of the Related Art

The HSDPA for transmitting high-speed data over a downlink line from a base station to a mobile station in a cellular system is studied in the 3GPP (3rd Generation Partnership Project). In this HSDPA, the High-Speed Physical Downlink Shared Channel (HS-PDSCH) is used for transmission over the downlink line from the base station to the mobile station. This HS-PDSCH is used for sending data from each base station to a plurality of mobile stations. Therefore, the base station or a controller thereof determines a schedule for sending data to each of the plurality of mobile stations, and sends data in different timing for each mobile station.

For controlling transmission of data from the base station to the mobile station as described above, each base station sets a DPCH (Dedicated Physical Channel) individually between itself and each of the plurality of mobile stations. This DPCH is used for sending control information from the base station to the mobile station by its downlink signal, and sending control information from the mobile station to the base station by an uplink signal in the reverse direction. Control information that is sent from the base station to the mobile station includes, for example, information of timing for sending data to the mobile station. In addition, for the HS-PDSCH, there exists a technique in which a modulation system enabling the highest-speed data transmission to be carried out within the bounds of achieving an intended bit error rate is selected to be used from a plurality of modulation systems (e.g. QPSK, 16QAM, 64QAM) depending on the state of a transmission line between the base station and the mobile station, with its transmission power fixed, but information of selection of the modulation system is also sent from the base station to the mobile station as control information.

On the other hand, control information that is sent from the mobile station to the base station includes, for example, reception confirmation notification information for each data block in the case where data is divided into a plurality of blocks, and is sent from the base station to the mobile station. There are also cases where for changing a modulation mode, quality of reception of common pilot signal sent from the base station is determined, and the result of the determination is sent from the base station to the mobile station as control information.

In each mobile station, the percentage of time during which data is received using the HS-PDSCH is small, but even in the state of standby for receiving data in which no data is being received, the DPCH continues to be set between the mobile station and the base station, thus making it possible to start transmission of data in a short time when the transmission of data is requested. Therefore, the number of mobile stations to which each base station sends data at a time is only one, but a large number of mobile stations are in the state of standby, and set the DPCH between themselves and the base station.

In the cellular system, there exists a technique called a soft handover in which the mobile station sets channels with a plurality of base stations at a time. Each base station sends the common pilot signal with predetermined power, and the mobile station sets the DPCH with a base station of which power for reception of the common pilot signal is the largest, but in the soft handover, when a different base station that is not so much different in power for reception of the common pilot signal exists, the mobile station sets the DPCH with the different base station to set the DPCH with a plurality of base stations. Hereinafter, the base station with which the DPCH is set in this manner is referred to as a connection base station.

In addition, in the cellular system, a technique called transmission power control of high-speed closed loop type may be applied. The transmission power control of high-speed closed loop type is applied to one or both of the uplink line and downlink line for the DPCH. For the transmission power control for the uplink line of the DPCH, the base station uses a dedicated pilot signal included in the uplink signal to determine its reception SIR (Signal to Interference Ratio), and compares the determined value with a predetermined desired SIR. Then, if the determined value is smaller than the desired SIR, the base station includes TPC (Transmit Power Control) bits indicating growth of power in the downlink signal of the DPCH to make a notification to the mobile station, and if it is not the case, the base station includes TPC bits indicating reduction of power in the downlink signal of the DPCH to communicate the same to the mobile station. Then, the mobile station receives the TPC bit, and increases or decreases the transmission power in accordance with the TPC bit. In the case where this transmission power control of the uplink line is used in combination with the soft handover, the mobile station receives the TPC bit from each of a plurality of connection base stations, and when at least one TPC bit indicates reduction of power, the mobile station decreases the transmission power of the DPCH, and if it is not the case (specifically, if all TPC bits indicate growth of power), it increases the transmission power of the DPCH. By carrying out such transmission power control, a desired SIR is achieved as quality of the uplink line signal in at least one connection base station, and the quality of reception of the uplink line signal is prevented from exceeding the desired SIR in all the connection base stations, thereby preventing interference wave power of the uplink line from being increased.

On the other hand, for transmission power control of the downlink line of the DPCH, the mobile station uses a dedicated pilot signal included in the downlink signal to determine its reception SIR, and compares the determined value with a predetermined desired SIR. Then, if the determined value is smaller than the desired SIR, the mobile station includes TPC bits indicating growth of power in the uplink signal of the DPCH to make a notification to the base station, and if it is not the case, the mobile station includes TPC bits indicating reduction of power in the uplink signal of the DPCH to communicate the same to the base station. Then, the base station receives the TPC bits, and increases or decreases the transmission power in accordance with the TPC bit. In the case where this transmission power control of the downlink line is used in combination with the soft handover, the mobile station receives the downlink line signal of the DPCH from each of plurality of connection base stations and synthesizes the same, and compares the synthesized reception SIR of the downlink line signal with the desired SIR to determine TPC bits. Then, common TPC bits are sent to a plurality of connection base stations, and each of connection base stations increases or decreases transmission power in accordance with the TPC bits. In this way, all connection base stations increase or decrease transmission power in accordance with the common TPC bits, thereby maintaining the balance among connection base stations, and the downlink line signal sent by the connection base station for which loss in transmission between itself and the mobile station is the smallest is received in good quality by the mobile station, so that the transmission power of the downlink line signal is prevented from being increased more than necessary to prevent the interference wave power of the downlink line from being increased.

The transmission power control and soft handover described above are effective techniques for reducing the interference wave power to increase line capacity by reducing the transmission power as a radio access method, particularly in a cellular system based on The CDMA (Code Division Multiple Access) method.

There are cases where a technique called a FCS (Fast Cell Selection) is applied for HS-PDSCH. This FCS is used in combination with the soft handover. In the FCS, data to be transmitted to the mobile station is sent to each of connection base stations. Then, the mobile station determines power for reception of the common pilot signal sent from each of the connection base stations, and communicates to each of the connection base stations the identification code of a connection base station of which reception power is the largest (hereinafter referred to as Primary base station). On the other hand, each of the connection base stations sends data by the HS-PDSCH if the communicated identification code is identical to that of its own station, and does not send data by the HS-PDSCH if it is not the case. The connection base station sending data in this way is frequently changed, whereby a connection base station with the transmission line in the best condition sends data, thus making it possible to transmit data more speedily when one modulation system is selected from a plurality of modulation systems with the transmission power fixed. In this FCS, information of the identification code the mobile station communicates to the connection base station is also control information that is sent from the mobile station to the base station by the uplink line signal of the DPCH for data transmission by the HS-PDSCH.

Furthermore, a technique called SSDT (Site Selection Diversity Transmit Power Control) may be applied for the DPCH. This SSDT is a technique similar to the FCS, and is used in combination with the soft handover. In the SSDT, the mobile station communicates the identification code of the Primary base station to each connection base station, and each connection base station sends the downlink line signal of the DPCH if the communicated identification code is identical to that of its own station, and does not send the downlink line signal of the DPCH if it is not the case. The connection base station sending the downlink line signal of the DPCH in this way is frequently changed, whereby a connection base station with the transmission line in the best condition sends data, and therefore when the transmission power of the downlink line signal is controlled so that the reception SIR of the downlink line signal in the mobile station tales on a predetermined desired value, the transmission power of the downlink line signal of the DPCH can be minimized, thus making it possible to increase line capacity. This SSDT is disclosed in Japanese Patent No. 2991185 and Japanese Patent No. 3047393.

For data transmission using the HS-PDSCH described above, if reliability of control information by the DPCH is low, control information reception errors in the base station and mobile station are increased, and thus efficiency of data transmission is reduced. The HS-PDSCH has larger transmission power than the downlink signal of each DPCH because high-speed data transmission is carried out, and therefore if transmission of a data block is failed and then the block is sent again, the interference wave power of the downlink line is significantly increased to reduce the line capacity.

As a method for preventing such reduction of efficiency of data transmission, a method can be considered in which the desired SIR used as the value of reception SIR is set to be a large value in the transmission power control of high-speed closed loop type. In the transmission power control of the uplink line, the base station sets the desired SIR to be a large value, whereby the mobile station sends the uplink line signal of the DPCH with large power, and the reception SIR of the uplink line signal received by the base station is increased, thus increasing reliability of control information. On the other hand, in the transmission power control of the downlink line, the mobile station sets the desired SIR to be a large value, whereby the base station sends the downlink line signal of the DPCH with large power, and the reception SIR of the downlink line signal received by the mobile station is increased, thus increasing reliability of control information.

In addition, in the FCS described above, each of the connection base stations makes a judgment on the identification code of the Primary base station communicated from the mobile station, and determines whether or not data is sent, depending on the result of the judgment. Therefore, reliability of control information is low, and if the Primary base station makes an erroneous judgment on the identification code, data is not sent, thus reducing efficiency of data transmission. In addition, if a connection base station other than the Primary base station makes an erroneous judgment on the identification code to send data, unnecessary data is sent, and thus the interference wave power is increased and the line capacity is decreased.

Because a desired SIR is achieved as quality of reception of the uplink line signal in at least one connection base station as described above, it is likely that the quality of reception of the uplink line signal in other connection base stations is below the desired SIR, if this FCS is used in combination with the transmission power control of the uplink line. Since the identification code of the Primary base station is included as control information in this uplink line signal, reliability of the identification code is high in at least one connection base station, but reliability of the identification code is low in other connection base stations. For a system in which the frequency used in the uplink line is different from the frequency used in the downlink line, because phasing for the uplink line is different from that for the downlink line, and the propagation loss in the uplink line of the Primary base station is not necessarily a minimum, reliability of the identification code in the Primary base station may be decreased. Thus, if it is used in combination with the transmission power control of the uplink line, in particular, the probability of occurrence of erroneous judgment on the identification code is high, and therefore efficiency of data transmission is reduced and the line capacity is decreased.

As a measure against the above problem, the connection base station sets the desired SIR to be a large value in the transmission power control of the uplink line, whereby reliability of the identification code can be increased in a larger number of connection base stations, thus making it possible to prevent a situation in which the efficiency of data transmission is reduced and the line capacity is decreased.

In addition, as another measure, a method in which the transmission power control of the uplink line during soft handover is carried out in a way different from the aforesaid method, namely a method in which when receiving TPC bits from each of a plurality of connection base stations, the mobile station increases the transmission power of the DPCH if at least one TPC bit indicates growth of power, and the mobile station decreases the transmission power of the DPCH if it is not the case (specifically if all TPC bits indicate reduction of power) is now under review in the 3GPP. In addition, a method in which when TPC bits are received from the current Primary base station or a new Primary base station, the transmission power of the mobile station is increased if at least one TPC bit indicates growth of power is also under review in the 3GPP. With these methods, the quality of reception of the uplink line signal can be brought close to the desired SIR to increase reliability of the identification signal in all the connection base stations and the Primary base station, thus making it possible to prevent a situation in which the efficiency of data transmission is reduced and the line capacity is decreased.

In addition, in the SSDT described above, if in connection base stations, the Primary base station erroneously receives the identification code of the Primary base station communicated from the mobile station to send no downlink line signal of the DPCH, none of the connection base stations sends the downlink line signal of the DPCH, and consequently reliability of the control information is decreased, efficiency of data transmission in the HS-PDSCH is reduced and the line capacity is decreased. As a measure against the above problem, the method not applying SSDT to DPCH is considered.

In addition, there are cases where the base station uses an adaptive antenna technique in which a dedicated pilot signal included in the uplink signal is used to estimate the arrival report of the uplink signal, an antenna directional pattern is adaptively formed so that the directional gain for the arrival direction is increased, and data is sent from the base station to the mobile station using the HS-PDSCH. The dedicated pilot signal consists of a predetermined code system, which is used as a reference signal to estimate the arrival direction. This adaptive antenna technique is described in detail in "Adaptive Array and Mobile Communication" (II) (The Institute of Electronics, Information and Communication Engineers Journal, Vol. 82, No. 1, pp. 55–61, January, 1999) and "Adaptive Array and Mobile Communication" (IV) (The Institute of Electronics, Information and Communication Engineers Journal, Vol. 82, No. 3, pp. 264–271, March, 1999), etc.

Due to this adaptive antenna technique, the power for reception of the HS-PDSCH is large in a location where the mobile station exists, and the reception power is relatively small in other locations, and therefore satisfactory line quality is obtained while reducing the interference wave power for other cells. At this time, if a modulation system enabling data to be transmitted at a maximum speed is selected from a plurality of modulation systems, and is used, higher-speed data transmission can be carried out even if transmission power is fixed. In addition, interference wave power for other cells is decreased, and the line capacity is increased.

In this adaptive antenna technique, the dedicated pilot signal needs to be received in good quality for improving accuracy of estimation of the arrival direction. As a measure for achieving this purpose, a method in which the base station sets the desired SIR to be a large value in the transmission power control of the uplink line can be considered.

However, in the transmission power control of the uplink line, if the desired SIR for use as a desired value of the reception SIR of the uplink line signal in the base station is set to be a large value, the transmission power of the uplink line signal is increased. Similarly, in the transmission power control of the downlink line, if the desired SIR for use as a desired value of the reception SIR of the downlink line signal in the mobile station is set to be a large value, the transmission power of the downlink line signal is increased. Also, in the transmission power control of the uplink line during soft handover, in the case where control is carried out for bringing the quality of reception of the uplink line signal close to the desired SIR in all the connection base stations or the Primary base station, the transmission power of the uplink signal is increased. As described previously, there is a disadvantage that since a large number of mobile stations are in the state of standby in which no data is being received using the HS-PDSCH, and set the DPCH between themselves and the base station, the interference wave power is increased and the line capacity is decreased as their transmission power is increased.

The transmission power is further increased due to an increase in interference wave power resulting from an increase in transmission power of the signal in other DPCHs. This is because for the signals of the uplink and downlink lines of the DPCH, the transmission power is controlled so that their reception SIRs are brought close to predetermined desired values. In this way, among a plurality of DPCHs, the transmission power is increased exponentially as the number of DPCHs set at a time is increased because they interfere with one another. As described previously, there is a disadvantage that since a large number of mobile stations are in the state of standby in which no data is being received using the HS-PDSCH, and set the DPCH between themselves and the base station, the interference wave power is increased exponentially, and the line capacity is significantly decreased if the transmission power of the uplink and downlink line signals of a large number of DPCHs is increased.

In addition, for a method in which the SSDT is not applied to the DPCH so as to prevent reliability of control information from being decreased due to the SSDT, there is a disadvantage that a large number of mobile stations are in the state of standby, and thus set the DPCH between themselves and the base station, but the SSDT cannot be applied to the DPCH of a large number of mobile stations, and therefore an effect of reduction of transmission power of the downlink line signal from the SSDT cannot be obtained, thus increasing the interference wave power in the downlink line, and decreasing the line capacity.

SUMMARY OF THE INVENTION

Accordingly, an object of the present invention is to solve the problems described above and provide a cellular system, a base station, a mobile station and a communication control method that can prevent an increase in interference wave power resulting from an increase in transmission power of the DPCH to increase line capacity while increasing reliability of control information for carrying out high-speed data communication from a base station to a mobile station.

In addition, another object of the present invention is to solve the problems described above and provide a cellular system, a base station, a mobile station and a communication control method that can prevent an increase in interference wave power resulting from an increase in transmission power of the DPCH to increase line capacity while enhancing quality of reception of a dedicated pilot signal in a base station.

For solving the above described problems, the cellular system according to the present invention is a cellular system comprising a plurality of base stations and a plurality of mobile stations existing in cells controlled by each of the above described base stations, the above described base station comprising means for sending a first signal including information to the above described mobile station using a shared channel, and means for setting a dedicated channel between itself and the above described mobile station to send a downlink signal including downlink control information and receive an uplink signal including uplink control information, the above described mobile station comprising means for receiving the above described first signal, and means for setting a dedicated channel between itself and a connection base station with one or more of the above described base stations to receive the above described downlink signal and send the above described uplink signal, characterized in that the system comprises reliability increasing means for increasing reliability of control information included in at least one of the above described downlink signal and the above described uplink signal sent/received by a predetermined mobile station in the case where the above described connection base station sends the above described first signal to the above described predetermined mobile station,.compared to the case where the above described sending is not carried out.

The communication control method according to the present invention is a communication control method in a cellular system comprising a plurality of base stations and a plurality of mobile stations existing in cells controlled by each of the above described base stations, the above described base station comprising a step of sending a first signal including information to the above described mobile station using a shared channel, and a step of setting a dedicated channel between itself and the above described mobile station to send a downlink signal including downlink control information and receive an uplink signal including uplink control information, the above described mobile station comprising a step of receiving the above described first signal, and a step of setting a dedicated channel between itself and a connection base station with one or more of the above described base stations to receive the above described downlink signal and send the above described uplink signal, characterized in that the method comprises reliability increasing step of increasing reliability of control information included in at least one of the above described downlink signal and the above described uplink signal sent/received by a predetermined mobile station in the case where the above described connection base station sends the above described first signal to the above described predetermined mobile station, compared to the case where the above described sending is not carried out.

The base station according to the present invention is a base station in a cellular system comprising a plurality of base stations and a plurality of mobile stations existing in cells controlled by each of the above described base stations, the above described base station comprising means for sending a first signal including information to the above described mobile station using a shared channel, and means for setting a dedicated channel between itself and the above described mobile station to send a downlink signal including downlink control information and receive an uplink signal including uplink control information, the above described mobile station comprising means for receiving the above described first signal, and means for setting a dedicated channel between itself and a connection base station with one or more of the above described base stations to receive the above described downlink signal and send the above described uplink signal, characterized in that the base station comprises reliability increasing means for increasing reliability of control information included in at least one of the above described downlink signal and the above described uplink signal sent/received by a predetermined mobile station in the case where the above described connection base station sends the above described first signal to the above described predetermined mobile station, compared to the case where the above described sending is not carried out.

The mobile station according to the present invention is a mobile station in a cellular system comprising a plurality of base stations and a plurality of mobile stations existing in cells controlled by each of the above described base stations, the above described base station comprising means for sending a first signal including information to the above described mobile station using a shared channel, and means for setting a dedicated channel between itself and the above described mobile station to send a downlink signal including downlink control information and receive an uplink signal including uplink control information, the above described mobile station comprising means for receiving the above described first signal, and means for setting a dedicated channel between itself and a connection base station with one or more of the above described base stations to receive the above described downlink signal and send the above described uplink signal, characterized in that the mobile station comprises reliability increasing means for increasing reliability of control in formation included in at least one of the above described downlink signal and the above described uplink signal sent/received by a predetermined mobile station in the case where the above described connection base station sends the above described first signal to the above described predetermined mobile station, compared to the case where the above described sending is not carried out.

According to the present invention, since transmission output of the uplink line from the mobile station or transmission output of the downlink line from the base station is increased only during transmission of the HS-PDSCH, growth of interference wave power resulting from the growth of transmission power of the DPCH can be controlled to increase line capacity while increasing reliability of control information.

DESCRIPTION OF THE PREFERRED EMBODIMENT

The preferred embodiment of the present invention will be described below referring to the accompanying drawings.

Figure 1:
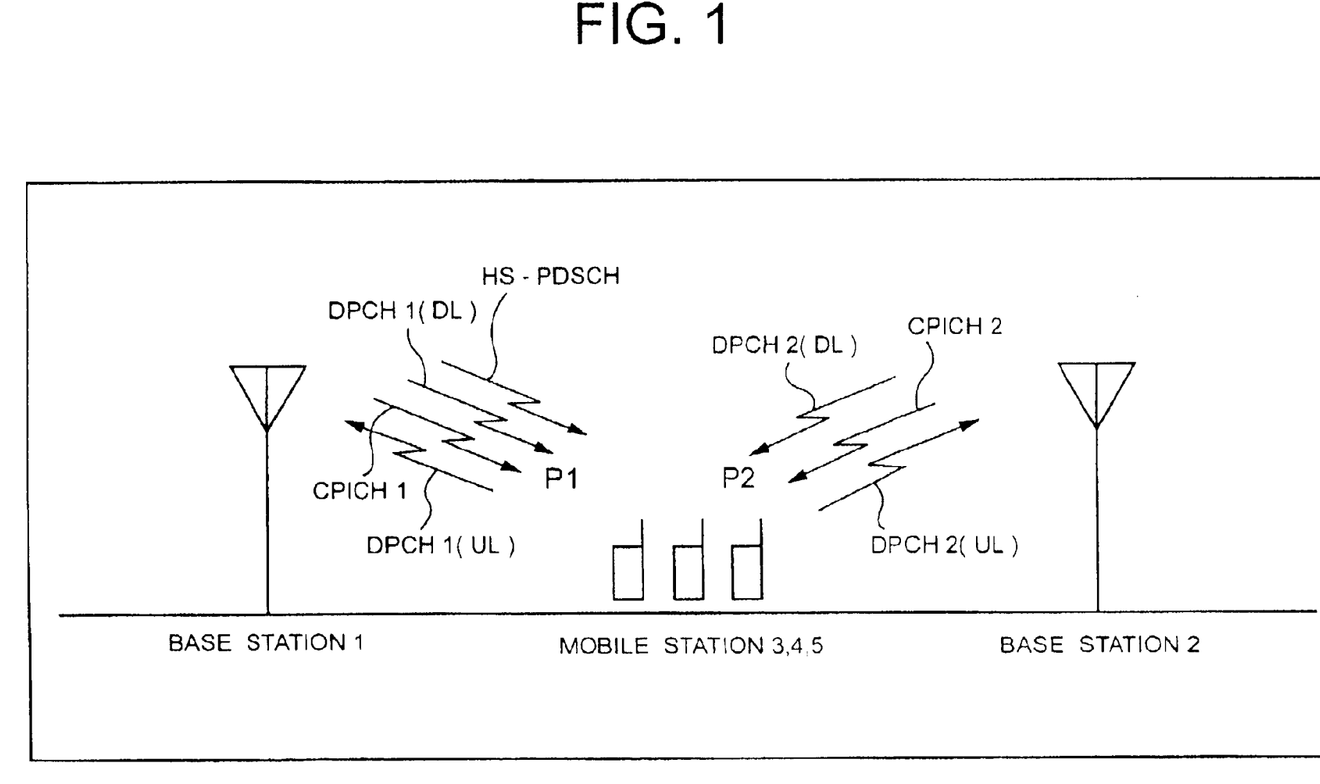
FIG. 1 is a block diagram of one example of a control information sending system according to the present invention.

FIG. 1 is a block diagram of one example of cellular system according to the present invention. Referring to FIG. 1, the cellular system comprises a base station 1, a base station 2 and mobile stations 3, 4, 5. Furthermore, the base station 1 and the base station 2 are provided in different cells.

Also, in this preferred embodiment, the case where two base stations 1, 2 exits for three mobile stations 3, 4, 5 will be described, but the present invention is not limited thereto, and can be applied in the case where three or more base stations exist for three mobile stations 3, 4, 5. Generally, a large number of mobile stations exist for one base station. In addition, the present invention can be applied even in the case where four or more mobile stations exist in the same transmission system, and FIG. 1 shows as one example the case where three mobile stations 3, 4, 5 exist. In addition, the CDMA (Code Division Multiple Access) method is used as a radio access method of making an access between the base station and the mobile stations 3, 4, 5.

In FIG. 1, it is shown that the signal of the HS-PDSCH, the signal of the DPCH 1 (Dedicated Physical Channel 1) (DL: Down Link: sending from the base station to the mobile station) and the signal of the CPICH1 (Common Pilot Channel 1) are sent from the base station 1 to the mobile station 3, and the signal of the DPCH 1 (UL: Up Link: sending from the mobile station to the base station) is sent from the mobile station 3 to the base station 1.

Similarly, it is shown that the signal of the DPCH 2 (DL) and the signal of the CPICH2 (Common Pilot Channel 2) are sent from the base station 2 to the mobile station 3, and the signal of the DPCH 2 (UL) is sent from the mobile station 3 to the base station 2. This DPCH 2 (UL) is different from the DPCH 1 (UL) for the receiving base station, but is consistent with the DPCH 1 (UL) for the send signal of the mobile station.

That is, it is shown that the signal of the HS-PDSCH and the signal of the CPICH are unidirectional signals, and the signal of the DPCH is a bidirectional signal.

The HS-PDSCH is a high-speed channel, and is used for sending/receiving a large file such as a dynamic image in a short time. On the other hand, the CPICH is a common pilot channel (downlink only), and common pilot signals are regularly sent over this channel from the base stations 1, 2 to the mobile station 3.

Figure 2:
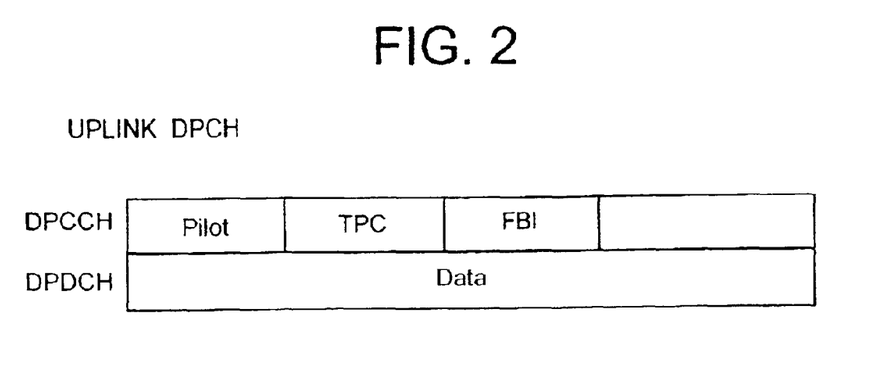
FIG. 2 is a frame block diagram of an uplink DPCH.
Figure 3:
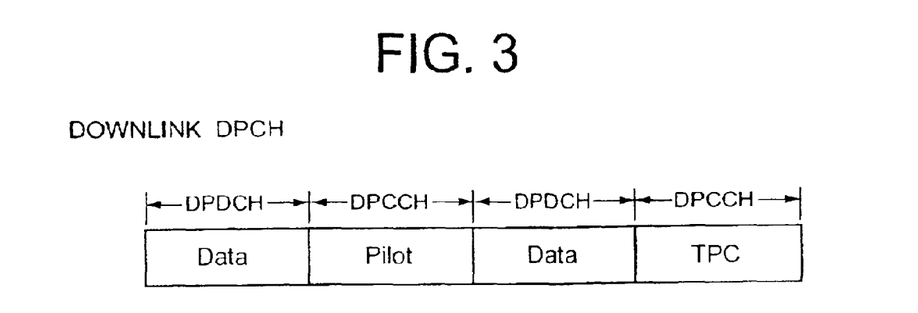
FIG. 3 is a frame block diagram of a downlink DPCH.

Also, the DPCH is a dedicated (physical) channel (both uplink and downlink), and one example of its slot structure is shown in FIGS. 2 and 3. FIG. 2 is a view of the slot structure of the uplink DPCH, and FIG. 3 is a view of the slot structure of the downlink DPCH.

Referring to FIG. 2, the slot of the uplink DPCH is a DPCCH (Dedicated Physical Control Channel), and a DPDCH (dedicated Physical Data Channel), the DPCCH comprises a dedicated pilot (Pilot), TPC bits and FBI (Feedback Information), and the DPDCH comprises signals (Data). This DPDCH has a data portion (data), which includes user information and control information. The DPCCH and DPDCH are sent at a time.

On the other hand, referring to FIG. 3, the slot of the downlink DPCH comprises data (Data)(DPDCH), pilot signals (Pilot)(DPCCH), data (Data)(DPDCH) and TPC (DPCCH). As for downlink, the DPDCH and DPCCH are sent alternatively.

Furthermore, for both the uplink DPCH and downlink DPCH, user information and control information are included in the data portion (Data) of the DPDCH. For both of the uplink DPCH and the downlink DPCH, the user information of the DPDCH includes a relatively small amount of information such as information of request to send a file. The control information includes control information for data transmission using the HS-PDSCH.

Operations of this preferred embodiment will now be described. Referring to FIG. 1, the mobile station 3 receives the CPICH1 from the base station 1 and the CPICH2 from the base station 2, and is in a state (soft handover) in which the DPCH 1 is set for the base station 1, and the DPCH 2 is set for the base station 2. In this case, the mobile station 3 receives the downlink line signals of the DPCHs 1 and 2 from the base station 1 and the base station 2, and subjects the same to diversity synthesis. The FCS is applied for the HS-PDSCH, and control information for the FCS is exchanged between the base station and the mobile station using the DPCH. In addition, for the HS-PDSCH, a technique of selecting adaptively a modulation system from a plurality of modulation systems is applied, control information for the selection is also exchanged between the base station and the mobile station using the DPCH.

Upon reception of the DPCHs 1 and 2 (UL) from the mobile station 3, the base stations 1, 2 determine the reception SIR of the DPCHs 1 and 2 (UL) using the dedicated pilot signals of the DPCHs 1 and 2 (UL), and compares the determined value with the desired SIR which the base stations 1, 2 have. Then, using the DPCHs 1 and 2 (DL) of downlink, the base stations communicate TCP bits of "Power Up" to the mobile station 3 if the determined value is smaller than the desired SIR, and communicate TCP bits of "Power Down" to the mobile station 3 if the determined value is greater than or equal to the desired SIR. For the DPCHs 1 and 2 (UL), transmission power control of high-speed closed loop type is applied in combination with soft handover.

On the other hand, the mobile station 3 receives TPC bits from a plurality of base stations, decreases transmission power of the DPCHs 1 and 2 (UL) if at least one TCP bit "Power Down" is communicated, and increases transmission power of the DPCHs 1 and 2 (UL) if it is not the case (if all the TPC bits are of "Power Up").

The base stations 1, 2 usually carry out such transmission power control in the case where the signal of HS-PDSCH is not sent (in the case of the state of standby for receiving HS-PDSCH data, namely in the case where only the DPCH is sent/received, if seen from the mobile station side), but as shown in this preferred embodiment, in the case where the signal of the HS-PDSCH is sent from the base stations 1, 2 to the mobile station 3, a value with the original value incremented by a predetermined offset value ($\Delta$) is set as a value of desired SIR before the signal is sent. Thus, in the case where the signal of the HS-PDSCH is sent from the base stations 1, 2, the mobile station 3 receiving the signal of the HS-PDSCH increases the transmission power of the DPCH. Then, the base stations 1, 2 get the value of desired SIR back into the original value when sending of the signal of the HS-PDSCH is completed.

In this way, since the mobile station 3 increases the transmission power of the uplink DPCH only during reception of the HS-PDSCH, the percentage of time during which the interference wave power of the uplink line is reduced, compared to the conventional method in which all mobile stations increase the transmission power of the DPCH not only during reception of the HS-PDSCH but also in the state of standby for receiving the HS-PDSCH. Thus, the average value of interference wave power of the uplink line can be reduced. Therefore, the line capacity of the uplink line can be increased while the quality of reception of control information in all the base stations targeted for soft handover is maintained at a satisfactory level.

The embodiments of the present invention will now be described. In the first to third embodiments, the transmission power of the DPCH sent from the mobile station or the base station during sending of data of the HS-PDSCH is increased. Specifically, in the first embodiment, the desired SIR of the base station is incremented by a predetermined offset value (Δ), thereby increasing the transmission power of the mobile station. In the second embodiment, when TPC bits are received from the current Primary station or a new primary station, the transmission power of the mobile station is increased when at least one TPC bit indicates growth of power. In the third embodiment, the desired SIR of the mobile station is incremented by a predetermined off set value (Δ), thereby increasing the transmission power of the base station. On the other hand, in the fourth embodiment, transmission power is not increased, but the SSDT described later is used when only the DPCH is sent/received, and the SSDT is not used when data of the HS-PDSCH is sent.

First, the first embodiment will be described. The view of system configuration is similar to FIG. 1 (the view of system configuration is similar to FIG. 1 also in the second to ninth embodiments described later).

A plurality of base stations (BS) are placed in a service area, and there are a plurality of mobile stations (MS) under control of each of the base stations. Each base station is connected to a common radio network controller (RNC). This common radio network controller controls base stations, and is sometimes called a base station controller. The radio network controller is connected to a communication network.

Step 1: Each base station BS sends the CPICH. The CPICH is diffused with scramble codes different for each cell, and each mobile station MS identifies a cell according to the difference in scrambles.

Step 2: When receiving downlink data, each mobile station MS sets DPCHs (uplink and downlink) with one or more base stations BS, and goes into the state of standby for receiving data.

Step 3: One mobile station MS1 sets the DPCH with the base station BS1 with power for reception of the CPICH being the largest.

Step 4: If the difference in power for reception of the CPICH between the base station BS1 and the base station BS2 is smaller than or equal to a predetermined value, the mobile station MS1 also sets the DPCH with the base station BS2, and is in a state in which the mobile station sets the DPCH with a plurality of base stations: BS1 and BS2 (soft handover).

Step 5: The uplink and downlink DPCHs include dedicated pilot signals (Pilot) consisting of predetermined bit systems.

Step 6: The transmission power of the uplink DPCH is controlled by transmission power control of high-speed closed loop type. In this control, the base station uses the dedicated pilot signal of the uplink DPCH to determine the reception SIR of the DPCH, and compares the determined value with the desired SIR of the base station. Then, using the downlink DPCH, the base station communicates TPC bits of "Power Up" to the mobile station if the determined value is smaller than the desired SIR, and communicates TPC bits of "Power Down" to the mobile station if the determined value is larger than or equal to the desired SIR. On the other hand, the mobile station receives TPC bits from a plurality of base stations, and decreases transmission power of the DPCH if at least one TPC bit is indicative of "Power Down", and increases the transmission power of the DPCH if it is not the case (i.e. if all the TPC bits are indicative of "Power Up").

Step 7: The above described value of desired SIR is communicated to each base station from the radio network controller RNC.

Step 8: Each base station sends the HS-PDSCH. The HS-PDSCH is a channel of which speed is enhanced, compared to the DPCH, and is sent with transmission power greater than that for the downlink DPCH.

Figure 4:
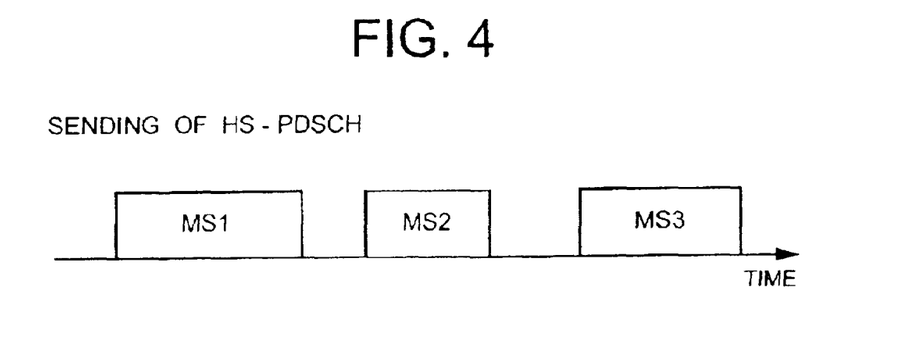
FIG. 4 is a timing diagram of sending of a HS-PDSCH.

Step 9: Each base station uses one HS-PDSCH for sending data to a plurality of mobile stations. The radio network controller RNC or the base station determines a schedule for sending data, and sends data in different timing for each mobile station. Specifically, as one example, the HS-PDSCH is first sent to the mobile station MS1, the HS-PDSCH is sent to the mobile station MS2 after the sending to the mobile station MS1 is completed, and then the HS-PDSCH is sent to the mobile station MS3 after the sending to the mobile station MS2 is completed, as shown in the timing diagram of the HS-PDSCH in FIG. 4.

Figure 5:
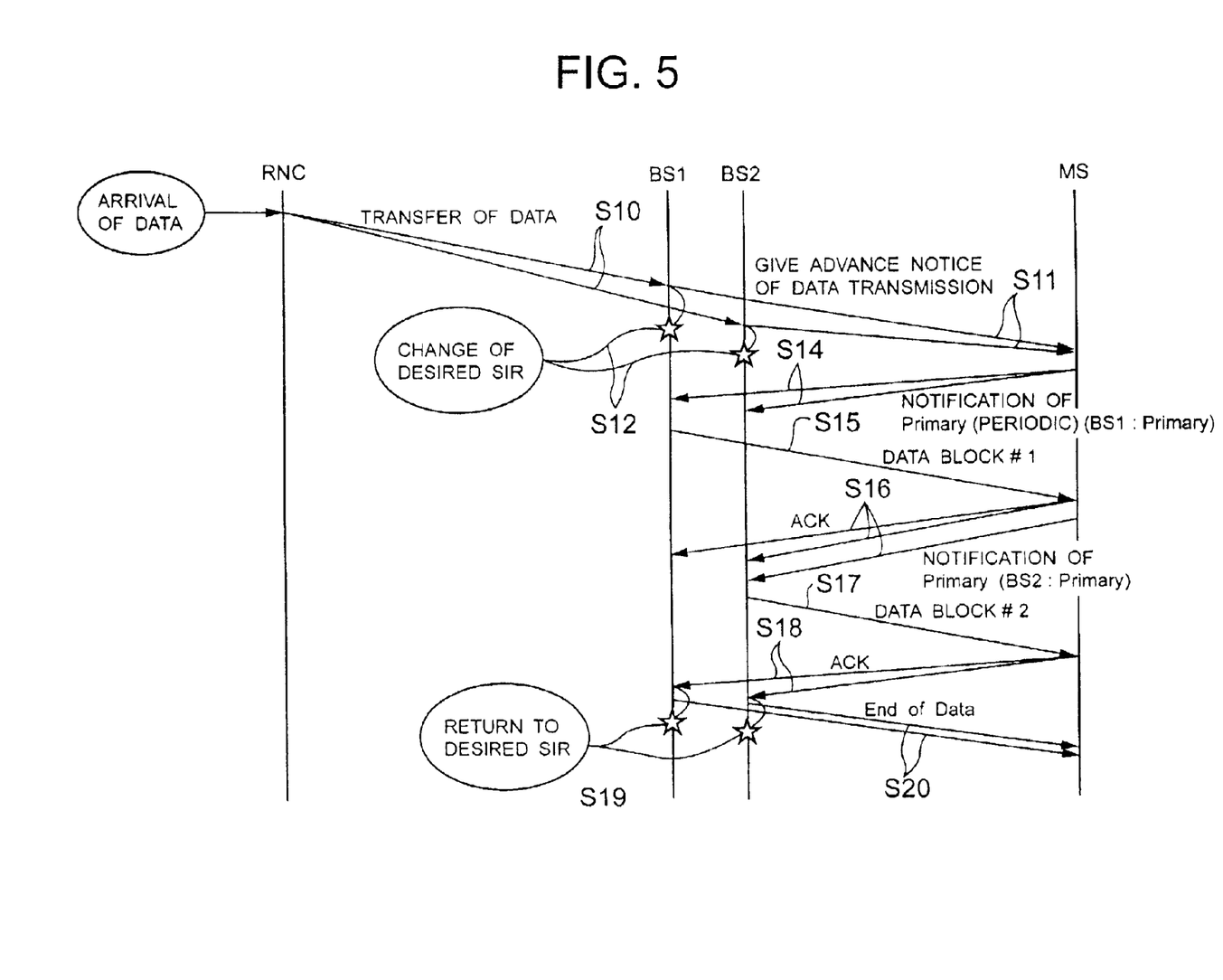
FIG. 5 is a sequence diagram showing operations of the first embodiment.

The following steps will be described referring to FIG. 5. FIG. 5 is a sequence diagram showing operations of the first embodiment.

Step 10: When data sent from the communication network to the mobile station MS1 arrives at the radio network controller RNC, the radio network controller RNC sends the data to both the base stations BS1 and BS2 with which the mobile station MS1 sets the DPCH.

Step 11: The base stations BS1 and BS2 use the DPCH to give the base station BS1 the advance notice of sending of data.

Step 12: The base stations BS1 and BS2 each set a value with the original value incremented by a predetermined offset value (Δ) as their desired SIR. Furthermore, the predetermined offset value (Δ) is communicated in advance from the radio network controller RNC. However, the predetermined offset value (Δ) can also be set fixedly for the base stations BS1 and BS2.

Step 13: The radio network controller RNC determines the identification codes of the base stations BS1 and BS2. For example, the identification codes are selected from a, b, c, . . . , h so that they are prevented from being identical to each other. Then, the radio network controller RNC communicates to the base stations BS1 and BS2 their respective identification codes, and also communicates the identification codes of the base stations BS1 and BS2 to the mobile station MS1.

Step 14: The mobile station MS1 determines the power for reception of the CPICH of the base stations BS1 and BS2, and uses the DPCH to communicate periodically the identification code of the base station of which reception power is the largest (hereinafter referred to as "Primary" (primary base station)) to both the base stations BS1 and BS2. This communication is performed even in the state of standby for receiving data.

Step 15: The base stations BS1 and BS2 receive notification of the identification code of Primary after a lapse of predetermined time after they give notice of sending data, and sends data to the mobile station MS1 using the HS-PDSCH if their own stations are the Primary. In this embodiment, the base station BS1 is the Primary. Furthermore, the BS2: a station that is not the Primary base station (hereinafter referred to as "non-Primary") does not send the data to the mobile station MS1.

Step 16: During sending of data, the mobile station MS1 periodically communicates the identification code of the Primary to both the base stations BS1 and BS2. In addition, the data consists of a plurality of data blocks, and the uplink DPCH is used to communicate information of numbers of received (or unreceived) data blocks to both the base stations BS1 and BS2.

Step 17: If the Primary base station is changed during sending of data, a new Primary base station uses the above described data block number to send subsequent data blocks. In this embodiment, the Primary base station is changed from the base station BS1 to the base station BS2 at Step 16.

Step 18: When sending of data is completed, the mobile station MS1 uses the DPCH to notify both the base stations BS1 and BS2 of end of data reception.

Step 19: When receiving notification of end of data reception from the mobile station MS1, the base stations BS1 and BS2 get each desired SIR back into the original value (a value obtained by subtracting the predetermined offset value ($\Delta$) from the current value).

Step 20: The base stations BS1 and BS2 notify the mobile station MS1 of end of data.

The second embodiment will now be described. In the first embodiment, the base stations BS1 and BS2 each set a value with the original value incremented by a predetermined offset value ($\Delta$) as their desired SIR at Step 12, but in the second embodiment, such a setting is not carried out. In the second embodiment, instead of changing the desired SIR, the mobile station MS1 starts operations for increasing the transmission power of the mobile station when at least one TPC bit indicates growth of power at the time receiving TPC bits from the current Primary or a new Primary, when reception of data is started. Thereafter, when reception of data is completed, a return to the original control is made.

In the conventional method, if only the DPCH is sent/received, the transmission power of the DPCH is decreased when at least one TPC bit is indicative of "Power Down", or the transmission power of the DPCH is increased when all the TPC bits indicate "Power Up" (See Step 6 in the first embodiment), while in the second embodiment, if the DPCH and HS-PDSCH are sent, the transmission power of the DPCH is increased when at least one of TPC bits sent from the current Primary or a new Primary is indicative of "Power Up", and therefore it is apparent that a power-up effect as with the first embodiment can be obtained.

The third embodiment will now be described. In the first embodiment, transmission power control of high-speed closed loop type is applied for the uplink DPCH, but in the third embodiment, transmission power control of high-speed closed loop type is applied also for the downlink DPCH. The base station has a desired SIR in the first embodiment, while the mobile station has a desired SIR in the third embodiment.

That is, in the first embodiment, a value with the original value incremented by a predetermined offset value ($\Delta$) is set as a desired SIR of the base station when the HS-PDSCH is sent (See Step 12 in the first embodiment). Thereby, the transmission power of the uplink DPCH of the mobile station is increased when the HS-PDSCH is sent.

On the other hand, in the third embodiment, a value with the original value incremented by a predetermined offset value ($\Delta$) is set as a desired SIR of the mobile station when the HS-PDSCH is sent. Thereby, the transmission power of the downlink DPCH of the base station is increased when the HS-PDSCH is sent. The offset value is communicated in advance from the radio network controller RNC.

In this embodiment, since reliability of control information communicated from the base station to the mobile station is increased, the probability that information for selection of a modulation system included in the control information is unsuccessfully communicated can be reduced, and thus efficiency of transmission of data using HS-PDSCH is enhanced.

The fourth embodiment will now be described. As described previously, the fourth embodiment is an embodiment in which the transmission power of the DPCH is not increased, but SSDT (Site Selection Diversity Transmission) is used for the DPCH when only the DPCH is sent/received, and the SSDT is not used when data of the HS-PDSCH is sent.

Figure 6:
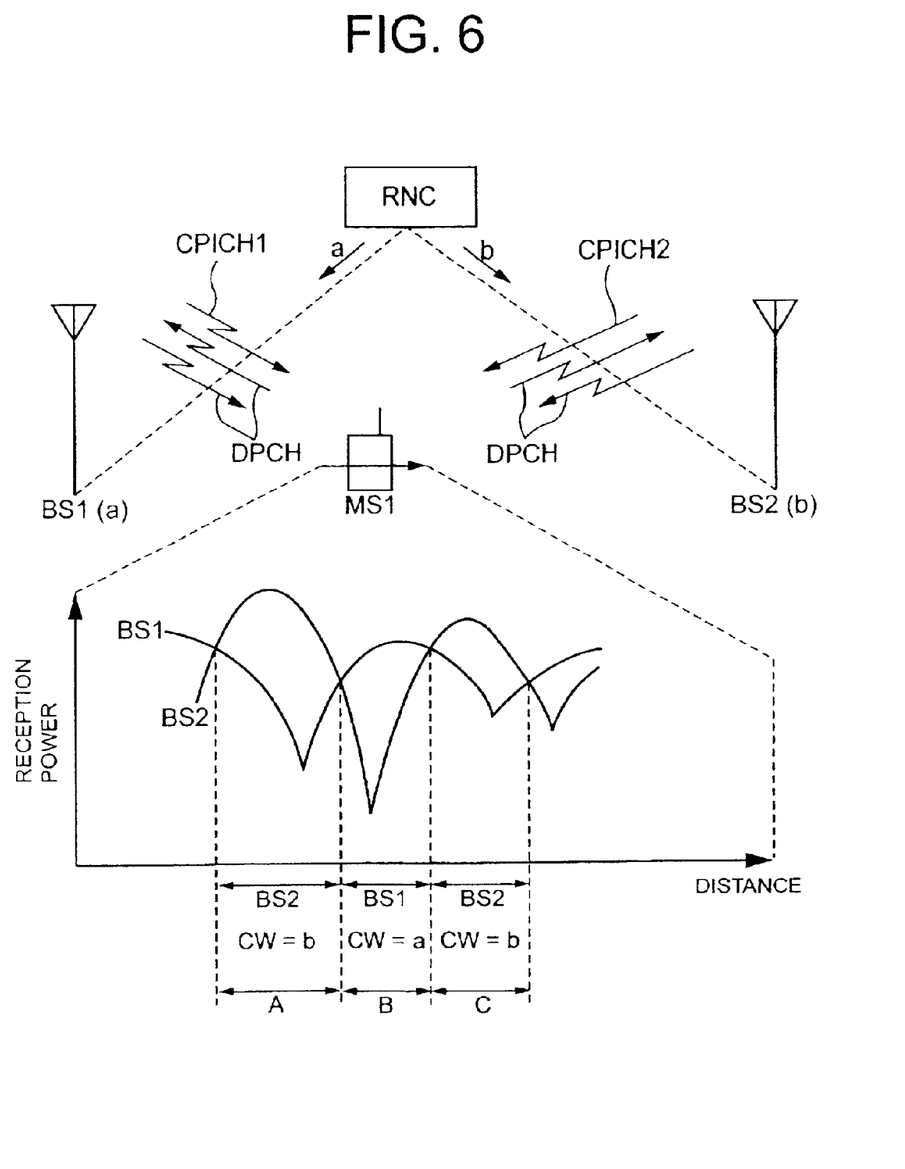
FIG. 6 is a conceptual view of SSDT.

FIG. 6 is a conceptual view of SSDT. Furthermore, as described previously, description as to this SSDT is included in Japanese Patent No. 2991185 and Japanese Patent No. 3047393. FIG. 6 shows a situation (soft handover) in which the mobile station MS1 sets the DPCH with the base stations BS1 and BS2. Now a situation in which the mobile station MS1 is moving from the cell with the base station BS1 existing therein to the cell with the base station BS2 existing therein (situation in which the mobile station MS1 is moving from the left side to the right side in FIG. 6) is considered.

Then, as the mobile station MS1 moves, the power for reception of the CPICH 1 from the base station BS1 and the power for reception of the CPICH 2 from the base station BS2 are increased and decreased interchangeably as shown in the reception power-to-distance property graph described in the lower part of FIG. 6. Specifically, in FIG. 6, the power for reception of the CPICH 2 from the base station BS2 is greater than the power for reception of the CPICH 1 from the base station BS1 in the A section, and this goes into reverse in the B section, and this goes into reverse again in the C section where the relation in magnitude of reception power is similar to that in the A section.

However, in the conventional soft handover, even if the relation in magnitude between the power for reception of the CPICH 1 from the base station BS1 and the power for reception of the CPICH 2 from the base station BS2 is changed as the mobile station MS1 moves in this way, the mobile station MS1 sends the DPCH to and receives the DPCH from both the base station BS1 and the base station BS2.

On the other hand, if the SSDT is used in this soft handover, in the A section, the power for reception of the CPICH 2 from the base station BS2 is greater than the power for reception of the CPICH 1 from the base station BS1 (the base station BS2 is the Primary), and therefore the base station BS2 sends the downlink DPCH, but the base station BS1 does not send the downlink DPCH. Similarly, in the B section, the power for reception of the CPICH 1 from the base station BS1 is greater than the power for reception of the CPICH 2 from the base station BS2 (the base station BS1 is the Primary), and therefore the base station BS1 sends the downlink DPCH, but the base station BS2 does not send the downlink DPCH. Similarly, in the C section, the power for reception of the CPICH 2 from the base station BS2 is greater than the power for reception of the CPICH 1 from the base station BS1 (the base station BS2 is the Primary), and therefore the base station BS2 sends the downlink DPCH, but the base station BS1 does not send the downlink DPCH.

In this way, the SSDT is such that the downlink DPCH is sent only from a base station of which power for reception of the CPICH is the greatest even in the soft handover state.

Furthermore, in the SSDT, the mobile station determines power for reception of the CPICH, and communicates the identification information of the Primary to the base station based on the determined reception power.

However, if this SSDT is used, there may be cases where due to erroneous reception of the identification code of the Primary communicated from the mobile station, the base station determines that none of the base stations is Primary, and thus transmission of the DPCH is interrupted.

Therefore, in the fourth embodiment, by preventing the SSDT from being used at the time of sending the HS-PDSCH, the mobile station MS1 can receive the downlink DPCH from both the base stations BS1 and BS2. Then, the mobile station MS1 subjects two downlink DPCHs to diversity synthesis. Thus, quality of DPCH communication at the time of sending the HS-PDSCH can be improved.

Figure 7:
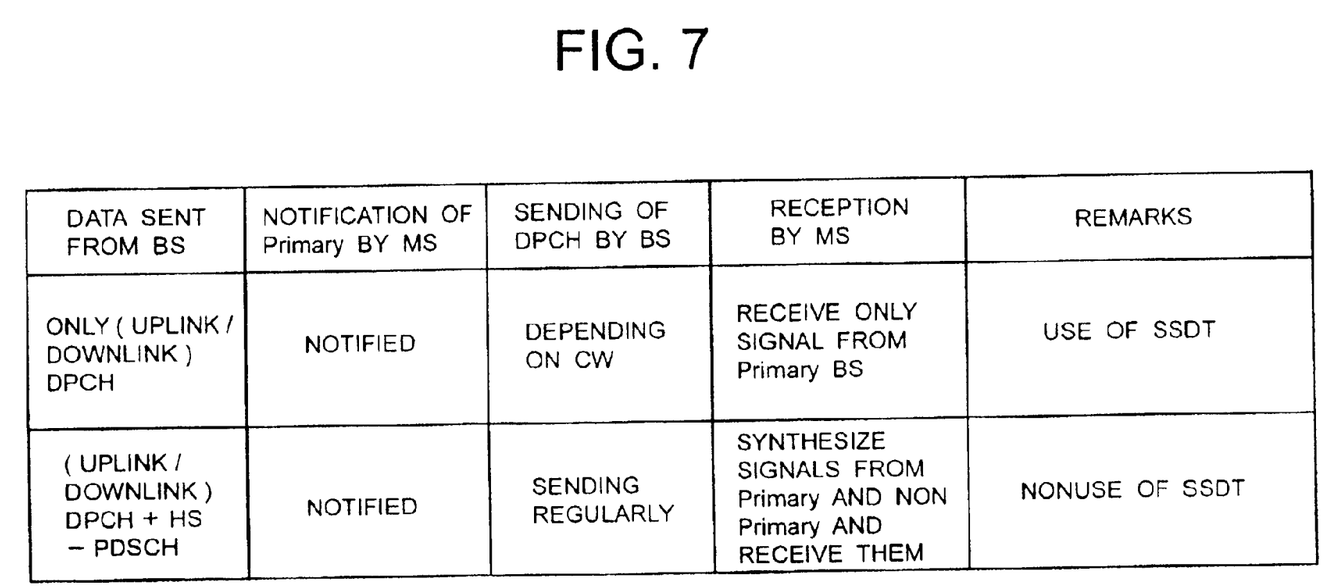
FIG. 7 is an explanatory view showing the outline of operations of the fourth embodiment.

FIG. 7 is an explanatory view showing the outline of operations in the fourth embodiment. Referring to FIG. 7, the SSDT is used if send/receive data from the base station is the DPCH. Thus, transmission of the DPCH from the base station is dependent on the CW (Code Word: Information included in the FBI of the uplink DPCCH, expressing the identification code of the Primary), and in the mobile station MS1, only the DPCH from the Primary base station is received. On the other hand, the SSDT is not used if send/receive data is the DPCH and HS-PDSCH (The HS-PDSCH is for send only). Thus, the DPCH is sent regularly from the base stations BS1 and BS2 in the soft handover state, and in the mobile station MS1, the DPCHs from the base stations BS1 and BS2 are synthesized and received.

The fifth embodiment will now be described. The fifth embodiment relates to a method of determining the offset value ($\Delta$) of the desired SIR adopted in the first and third embodiments.

Step 1: The mobile station MS1 determines reception power P1 for the CPICH from the base station BS1 and reception power P2 for the CPICH from the base station BS2, and communicates the same to the radio network controller RNC. This communication may be carried out periodically either before or after setting of the DPCH.

Step 2: The radio network controller RNC uses the reception powers P1 and P2 to determine the offset value ($\Delta$). For example, the offset value ($\Delta$) equals the absolute value of a difference between reception powers P1 and P2 (where reception powers P1 and P2 are decibel values).

Step 3: The radio network controller RNC communicates the determined offset value ($\Delta$) to the base stations BS1 and BS2 and the mobile station MS1.

The sixth embodiment will now be described. The sixth embodiment relates to a method of determining the offset value ($\Delta$) of the desired SIR adopted in the first embodiment, as in the case of the fifth embodiment.

Step 1: The mobile station MS1 determines reception power P1 for the CPICH from the base station BS1 and reception power P2 for the CPICH from the base station BS2, and communicates the same to the base stations BS1 And BS2. This communication is carried out after setting of the DPCH. The communication is carried out periodically or whenever reception powers P1 and P2 change.

Step 2: The base stations BS1 and BS2 use the reception powers P1 and P2 to determine the offset value($\Delta$). For example, the offset value ($\Delta$) equals the absolute value of a difference between reception powers P1 and P2.

The seventh embodiment will now be described. The seventh embodiment 7 relates to a method of determining the offset value of the desired SIR adopted in the third embodiment, as in the case of the fifth and sixth embodiments.

Step 1: The mobile station MS1 determines reception power P1 for the CPICH from the base station BS1 and reception power P2 for the CPICH from the base station BS2.

Step 2: The mobile station MS1 uses the reception powers P1 and P2 to determine the offset value ($\Delta$). For example, the offset value ($\Delta$) equals the absolute value of a difference between reception powers P1 and P2.

The eighth embodiment will now be described. The eighth embodiment relates to a change of the desired SIR by the radio network controller RNC. The base station may autonomously change the desired SIR in the base station (or mobile station), but the radio network controller may also change the desired SIR by communicating the desired SIR to the base station (or mobile station). Operations when the radio network controller RNC communicates the desired SIR to the base station (or mobile station) are as follows.

1. The desired SIR is periodically communicated to the base station (or mobile station) from the radio network controller RNC, and accordingly the base station (or mobile station) updates the desired SIR.

2. When data is sent using the HS-PDSCH, the radio network controller RNC adds a predetermined offset value ($\Delta$) to the desired SIR, and communicates the same to the base station (or the mobile station).

The ninth embodiment will now be described. In the ninth embodiment, the RNC determines the offset value as in the case of the fourth embodiment as well as the eighth embodiment. In the fifth, sixth, seventh and ninth embodiments, the offset value is determined in accordance with a difference in power for reception of the CPICH between base stations, and the difference in propagation loss becomes larger as the difference in reception power is increased. Therefore, the larger the difference in propagation loss of the propagation path for the DPCH, the higher value is set as an offset value, thus making it possible to set an offset value necessary and sufficient for considering as a predetermined reliability of control information exchanged in the DPCH with large propagation loss. Thereby, interference wave power can be reduced without increasing the offset value more than necessary.

The tenth to twelfth embodiments will now be described. In the tenth to twelfth embodiments, the base station uses the dedicated pilot signal included in the DPCCH of the uplink DPCH to adaptively form an antenna directional pattern, and sends the HS-PDSCH using the antenna directional pattern. Specifically, the base station uses the dedicated pilot signal to estimate the direction in which the above described DPCH arrives, and forms the antenna directional pattern so that the directional gain in the arrival direction is increased.

The tenth embodiment is same as the first embodiment except that the antenna directional pattern of the HS-PDSCH is adaptively formed.

The eleventh embodiment is same as the sixth embodiment except that the antenna directional pattern of the HS-PDSCH is adaptively formed.

The twelfth embodiment is same as the ninth embodiment except that the antenna directional pattern of the HS-PDSCH is adaptively formed.

In the tenth to twelfth embodiments, as in the case of the first, sixth and ninth embodiments, respectively, the capacity of the uplink line can be increased while maintaining quality of reception of control information in all the base stations targeted for soft handover at a satisfactory level. In addition, the base station sets a value with the original value incremented by a predetermined offset value (Δ) as the desired SIR for controlling transmission power of the uplink DPCH of the mobile station during a time period over which the HS-PDSCH is sent to a specified mobile station, and gets the value of desired SIR back into the original value when the sending of the signal of HS-PDSCH is completed. Therefore, quality of reception of the dedicated pilot signal from the mobile station is improved during a time period over which the HS-PDSCH is sent, thus making it possible to estimate with high accuracy the direction in which the signal of the uplink DPCH from the mobile station arrives. Thereby, the antenna directional pattern can be formed so that the antenna gain in the direction of the mobile station reaches the maximum level.

The cellular system according to the present invention is a cellular system comprising a plurality of base stations and a plurality of mobile stations existing in cells controlled by each of the above described base stations, the above described base station comprising means for sending a first signal including information to the above described mobile station using a shared channel, and means for setting a dedicated channel between itself and the above described mobile channel to send a downlink signal including downlink control information and receive an uplink signal including uplink control information, the above described mobile station comprising means for receiving the above described first signal, and means for setting a dedicated channel between itself and a connection base station with one or more of the above described base stations as the above described connection base station to receive the above described downlink signal and send the above described uplink signal, wherein the system comprises reliability increasing means for increasing reliability of control information included in at least one of the above described downlink signal and the above described uplink signal sent/received by a predetermined mobile station in the case where the above described connection base station sends the above described first signal to the above described predetermined mobile station, compared to the case where the above described sending is not carried out, thus making it possible to prevent growth of interference wave power resulting from the growth of transmission power of the DPCH to increase line capacity while increasing reliability of control information.

Also, the communication control method, the base station and the mobile station according to the present invention each has an effect similar to that of the above described cellular system.

This will be described below more specifically.

1. Changing of a desired set value in the base station and switching of transmission control operation in the mobile station.

Because the mobile station increases transmission power of the uplink DPCH only when the HS-PDSCH is sent/received, the percentage of time during which the interference wave power of the uplink line is increased is small, compared to the conventional method in which all the mobile stations increase the transmission power of the DPCH irrespective of whether or not the HS-PDSCH is sent/received. Therefore, the average value of interference wave power of the uplink line can be reduced. Thus, the capacity of the uplink line can be increased while maintaining the quality of reception of control information in a plurality of base stations at a satisfactory level.

Also, since there are no possibilities that a plurality of mobile stations increase the transmission power of the uplink DPCH at a time because data is sent in different timing for each mobile station, the maximum value of the interference wave power of the uplink line can be reduced. Particularly, if a large number of mobile stations increase the transmission power of the uplink line at a time, the interference wave power of the uplink line is increased exponentially for the number of mobile stations to meet the required SIR in their respective lines, but according to the present invention, such an increase in interference wave power can be avoided because only one mobile station increases the transmission power of the uplink line. Therefore, the capacity of the uplink line can be significantly increased. Furthermore, the reason why "only one mobile station increases the transmission power of the uplink line" is that in each cell, sending of data using the HS-PDSCH is carried out on a one-by-one basis for each of the mobile stations.

2. Use and nonuse of SSDT of the DPCH in association with the state of standby for sending/receiving data and the state in which data is being sent/received.

In the SSDT, there may be cases where it is determined that none of the base stations is the Primary due to the error of reception of the identification code communicated to the base station from the mobile station, and thus the sending of the DPCH is interrupted. Thus, the SSDT is got into the "nonuse" state during send/receive of data, whereby quality of communication of the DPCH is improved during that time, and therefore the possibility that efficiency of data transmission using the HS-PDSCH is reduced due to the error of reception of control information sent with the DPCH is eliminated. Since the HS-PDSCH is sent with greater transmission power than that for the DPCH, the probability of resending data with the HS-PDSCH can be reduced even if the transmission power of the DPCH is increased, by increasing reliability of control information sent/received using the DPCH to control sending of the HS-PDSCH, during send/receive of data with the HS-PDSCH, and therefore as a whole, the transmission power of uplink can be reduced, and the interference wave power for other mobile stations can be reduced. Thus, the line capacity can be increased. In this way, since the SSDT can be applied to the DPCH for a large number of mobile stations in the state of standby for receiving data with the HS-PDSCH while preventing an increase in interference wave power due to data transmission, the interference wave power can be reduced as a whole system, and the line capacity can be increased.

3. Change of desired set values in the mobile station.

As in the case of the Item 2, during send/receive of data, reliability of control information of the DPCH is increased, whereby efficiency of data transmission of the HS-PDSCH is increased to prevent the growth of interference wave power resulting from data transmission, and in the DPCH for a large number of mobile stations in the state of standby for receiving data with the HS-PDSCH, the transmission power of the downlink DPCH is decreased, and thus the interference wave power can be reduced because the desired SIR is not increased, and therefore as a whole system, the interference wave power can be reduced, and the capacity of the downlink line can be increased.

4. Formation of antenna directional patterns.

During send/receive of data, by enhancing reception quality in the base station for the dedicated pilot signal included in the uplink DPCH, a high antenna gain can be obtained for the mobile station receiving data of the HS-PDSCH, thus making it possible to enhance efficiency of data transmission. At the same time, the base station does not increase the desired SIR for the uplink DPCH of a large number of mobile stations in the state of standby for receiving data with the HS-PDSCH, and therefore the transmission power of the uplink DPCH is decreased. Thus, the interference wave power can be reduced, and the capacity of the uplink line can be increased.

What is claimed is:

1. A cellular system comprising a plurality of base stations and a plurality of mobile stations existing in cells controlled by each of said base stations,
    said base station comprising means for sending a first signal including information to said mobile station using a shared channel; and
    means for setting a dedicated channel between itself and said mobile station to send a downlink signal including downlink control information and receive an uplink signal including uplink control information,
    said mobile station comprising means for receiving said first signal; and
    means for setting a dedicated channel between itself and a connection base station with one or more of said base stations to receive said downlink signal and send said uplink signal,
    wherein said system comprises reliability increasing means for increasing reliability of control information included in at least one of said downlink signal and said uplink signal sent/received by a predetermined mobile station in the case where said connection base station sends said first signal to said predetermined mobile station, compared to the case where said sending is not carried out.

2. The cellular system according to claim 1, comprising means for controlling transmission of said first signal using said uplink control information and said downlink control information.

3. The cellular system according to claim 1, wherein said base station comprises means for sending a common pilot signal,
    said predetermined mobile station comprises means for receiving said common pilot signal sent from each of said connection base stations, and communicating transmission control information based on power for reception thereof to said connection base stations, and
    each of said connection base stations comprises means for determining based on said communication whether or not said first signal is sent.

4. The cellular system according to claim 1, wherein each of said connection base stations comprises means for determining the reception SIR of said uplink signal sent from said predetermined mobile station, and controlling transmission power of said uplink signal sent from said predetermined mobile station, based on said reception SIR and a predetermined desired value, and
    said reliability increasing means increases said reliability by changing said desired value.

5. The cellular system according to claim 4, comprising a base station controller connected to each of said connection base stations,
    wherein said base station controller comprises means for communicating said desired value or a changed amount of said desired value to each of said connection stations or said predetermined mobile station, and
    said reliability increasing means changes said desired value in accordance with said communication.

6. The cellular system according to claim 4, wherein said base station comprises means for sending a common pilot signal,
    said predetermined mobile station comprises means for determining power for reception of said common pilot signal sent from each of said connection base stations, and
    said reliability increasing means changes said desired value based on the result of said determination.

7. The cellular system according to claim 4, where in the mobile station sends a dedicated pilot signal as uplink control information, and the base station adaptively forms an antenna directional pattern to send said first signal, using said dedicated pilot signal.

8. The cellular system according to claim 1, wherein said predetermined mobile station comprises means for synthesizing said downlink signals sent from said plurality of connection base stations to determine the reception SIR, and controlling transmission power of said downlink signal sent from each of said connection base stations, based on said reception SIR and a predetermined SIR, and
    said reliability increasing means increases said reliability by changing said desired value.

9. The cellular system according to claim 5, wherein said base station comprises means for sending a common pilot signal,
    said predetermined mobile station comprises means for receiving said common pilot signal sent from each of said connection base stations, and communicating information about power for reception thereof to said base station controller, and
    said base station controller determines said desired value or the changed amount of said desired value based on said communication.

10. The cellular system according to claim 1, wherein each of said connection base stations comprises means for communicating to said predetermined mobile station transmission power control information based on the reception SIR of said uplink signal sent from said predetermined mobile station,
    said predetermined mobile station comprises first power controlling means for controlling transmission power in accordance with transmission power control information for decreasing transmission power of said uplink signal if different transmission power control information is informed by a plurality of said connection base stations to said first power controlling means; and
    second power controlling means for controlling transmission power in accordance with transmission power control information for increasing transmission power of said uplink signal if different transmission power control information is informed by a plurality of said connection base stations to said first power controlling means, and
    said reliability increasing means increases said reliability by switching from said first power controlling means to said second power controlling means.

11. The cellular system according to claim 1, wherein each of said base stations comprises means for sending a common pilot signal,
    said predetermined mobile station comprises means for receiving said common pilot signal sent from each of said connection base stations, and communicating transmission control information based on the power for reception thereof to said connection base stations,
    each of said connection base stations comprises first transmission controlling means for determining in accordance with said communication whether or not said downlink signal is sent; and second transmission controlling means for sending said downlink signal irrespective of said communication, and said reliability increasing means increases said reliability by switching from said first transmission controlling means to said second transmission controlling means.

12. A communication control method in a cellular system comprising a plurality of base stations and a plurality of mobile stations existing in cells controlled by each of said base stations, said base station comprising a step of sending a first signal including information to said mobile station using a shared channel; and a step of setting a dedicated channel between itself and said mobile station to send a downlink signal including downlink control information and receive an uplink signal including uplink control information, said mobile station comprising a step of receiving said first signal; and a step of setting a dedicated channel between itself and a connection base station with one or more of said base stations to receive said downlink signal and send said uplink signal, wherein said method comprises a reliability increasing step of increasing reliability of control information included in at least one of said downlink signal and said uplink signal sent/received by a predetermined mobile station in the case where said connection base station sends said first signal to said predetermined mobile station, compared to the case where said sending is not carried out.

13. The communication control method according to claim 12, comprising a step of controlling transmission of said first signal using said uplink control information and said downlink control information.

14. The communication control method according to claim 12, wherein said base station comprises a step of sending a common pilot signal, said predetermined mobile station comprises a step of receiving said common pilot signal sent from each of said connection base stations, and communicating transmission control information based on power for reception thereof to said connection base stations, and each of said connection base stations comprises a step of determining based on said communication whether or not said first signal is sent.

15. The communication control method according to claim 12, wherein each of said connection base stations comprises a step of determining the reception SIR of said uplink signal sent from said predetermined mobile station, and controlling transmission power of said uplink signal sent from said predetermined mobile station, based on said reception SIR and a predetermined desired value, and in said reliability increasing step, said reliability is increased by changing said desired value.

16. The communication control method according to claim 15, comprising a base station controller connected to each of said connection base stations, wherein said base station controller comprises a step of communicating said desired value or a changed amount of said desired value to each of said connection stations or said predetermined mobile station, and in said reliability increasing step, said desired value is changed in accordance with said communication.

17. The communication control method according to claim 16, wherein said base station comprises a step of sending a common pilot signal, said predetermined mobile station comprises a step of receiving said common pilot signal sent from each of said connection base stations, and communicating information about power for reception thereof to said base station controller, and said base station controller determines said desired value or the changed amount of said desired value based on said communication.

18. The communication control method according to claim 15, wherein said base station comprises a step of sending a common pilot signal, said predetermined mobile station comprises a step of determining power for reception of said common pilot signal sent from each of said connection base stations, and in said reliability increasing step, said desired value is changed based on the result of said determination.

19. The communication control method according to claim 15, wherein the mobile station sends a dedicated pilot signal as uplink control information, and the base station adaptively forms an antenna directional pattern to send said first signal, using said dedicated pilot signal.

20. The communication control method according to claim 12, wherein said predetermined mobile station comprises a step of synthesizing said downlink signals sent from said plurality of connection base stations to determine the reception SIR, and controlling transmission power of said downlink signal sent from each of said connection base stations, based on said reception SIR and a predetermined SIR, and in said reliability increasing step, said reliability is increased by changing said desired value.

21. The communication control method according to claim 12, wherein each of said connection base stations comprises a step of communicating to said predetermined mobile station M transmission power control information based on the reception SIR of said uplink signal sent from said predetermined mobile station, said predetermined mobile station comprises a first power controlling step of controlling transmission power in accordance with transmission power control information for decreasing transmission power of said uplink signal if different transmission power control information is informed by a plurality of said connection base stations to said first power controlling means; and a second power controlling step of controlling transmission power in accordance with transmission power control information for increasing transmission power of said uplink signal if different transmission power control information is informed by a plurality of said connection base stations to said first power controlling means, and in said reliability increasing step, said reliability is increased by switching from said first power controlling step to said second power controlling step.

22. The communication control method according to claim 12, wherein each of said base stations comprises a step of sending a common pilot signal, said predetermined mobile station comprises a step of receiving said common pilot signal sent from each of said connection base stations, and communicating transmission control information based on the power for reception thereof to said connection base stations, each of said connection base stations comprises a first transmission controlling step of determining in accordance with said communication whether or not said downlink signal is sent; and a second transmission controlling step of sending said downlink signal irrespective of said communication, and said reliability increasing means increases said reliability by switching from said first transmission controlling step to said second transmission controlling step.

23. A base station of a cellular system comprising a plurality of base stations and a plurality of mobile stations existing in cells controlled by each of said base stations, said base station comprising means for sending a first signal including information to said mobile station using a shared channel; and means for setting a dedicated channel between itself and said mobile station to send a downlink signal including downlink control information and receive an uplink signal including uplink control information, said mobile station comprising means for receiving said first signal; and means for setting a dedicated channel between itself and a connection base station with one or more of said base stations to receive said downlink signal and send said uplink signal, wherein said base station comprises reliability increasing means for increasing reliability of control information included in at least one of said downlink signal and said uplink signal sent/received by a predetermined mobile station in the case where said connection base station sends said first signal to said predetermined mobile station, compared to the case where said sending is not carried out.

24. The base station according to claim 23, comprising means for controlling transmission of said first signal using said uplink control information and said downlink control information.

25. The base station according to claim 23, wherein said base station comprises means for sending a common pilot signal, said predetermined mobile station comprises means for receiving said common pilot signal sent from each of said connection base stations, and communicating transmission control information based on power for reception thereof to said connection base stations, and each of said connection base stations comprises means for determining based on said communication whether or not said first signal is sent.

26. The base station according to claim 23, wherein each of said connection base stations comprises means for determining the reception SIR of said uplink signal sent from said predetermined mobile station, and controlling transmission power of said uplink signal sent from said predetermined mobile station, based on said reception SIR and a predetermined desired value, and said reliability increasing means increases said reliability by changing said desired value.

27. The base station according to claim 26, wherein said base station comprises means for sending a common pilot signal, said predetermined mobile station comprises means for determining power for reception of said common pilot signal sent from each of said connection base stations, and said reliability increasing means changes said desired value based on the result of said determination.

28. The base station according to claim 26, wherein an antenna directional pattern is adaptively formed to send said first signal, using the dedicated pilot signal sent as uplink information from the mobile station.

29. The base station according to claim 23, wherein each of said base stations comprises means for sending a common pilot signal, said predetermined mobile station comprises means for receiving said common pilot signal sent from each of said connection base stations, and communicating transmission control information based on the power for reception thereof to said connection base stations, each of said connection base stations comprises first transmission controlling means for determining in accordance with said communication whether or not said downlink signal is sent; and second transmission controlling means for sending said downlink signal irrespective of said communication, and said reliability increasing means increases said reliability by switching from said first transmission controlling means to said second transmission controlling means.

30. A mobile station of a cellular system comprising a plurality of base stations and a plurality of mobile stations existing in cells controlled by each of said base stations, said base station comprising means for sending a first signal including information to said mobile station using a shared channel; and means for setting a dedicated channel between itself and said mobile station to send a downlink signal including downlink control information and receive an uplink signal including uplink control information, said mobile station comprising means for receiving said first signal; and means for setting a dedicated channel between itself and a connection base station with one or more of said base stations to receive said downlink signal and send said uplink signal, wherein said mobile station comprises reliability increasing means for increasing reliability of control information included in at least one of said downlink signal and said uplink signal sent/received by a predetermined mobile station in the case where said connection base station sends said first signal to said predetermined mobile station, compared to the case where said sending is not carried out.

31. The mobile station according to claim 30, comprising means for controlling transmission of said first signal using said uplink control information and said downlink control information.

32. The mobile station according to claim 30, wherein said base station comprises means for sending a common pilot signal, said predetermined mobile station comprises means for receiving said common pilot signal sent from each of said connection base stations, and communicating transmission control information based on power for reception thereof to said connection base stations, and each of said connection base stations comprises means for determining based on said communication whether or not said first signal is sent.

33. The mobile station according to claim 30, wherein said predetermined mobile station comprises means for synthesizing said downlink signals sent from each of said connection base stations to determine the reception SIR, and controlling transmission power of said downlink signal sent from each of said connection base stations, based on said reception SIR and a predetermined SIR, and said reliability increasing means increases said reliability by changing said desired value.

34. The mobile station according to claim 33, wherein said base station comprises means for sending a common pilot signal, said predetermined mobile station comprises means for determining power for reception of said common pilot signal sent from each of said connection base stations, and said reliability increasing means changes said desired value based on the result of said determination.

35. The mobile station according to claim 30, wherein each of said connection base stations comprises means for communicating to said predetermined mobile station transmission power control information based on the reception SIR of said uplink signal sent from said predetermined mobile station, said predetermined mobile station comprises first power controlling means for controlling transmission power in accordance with transmission power control information for decreasing transmission power of said uplink signal if different transmission power control information is informed by a plurality of said connection base stations to said first power controlling means; and second power controlling means for controlling transmission power in accordance with transmission power control information for increasing transmission power of said uplink signal if different transmission power control information is informed by a plurality of said connection base stations to said first power controlling means, and said reliability increasing means increases said reliability by switching from said first power controlling means to said second power controlling means.

* * * * *